March 17, 1970     R. D. BOONE ET AL     3,500,856

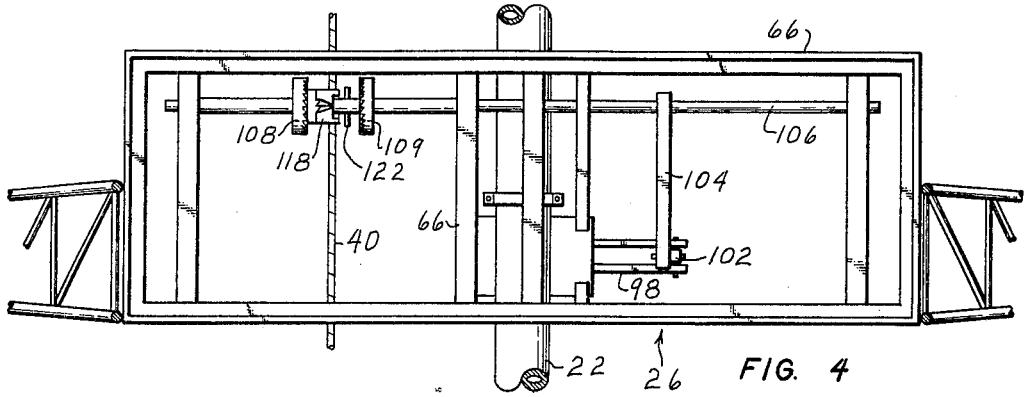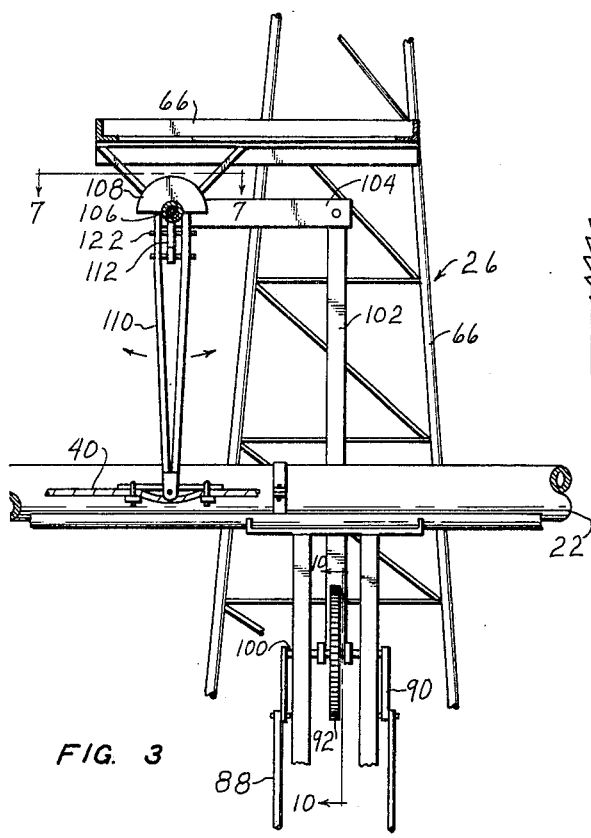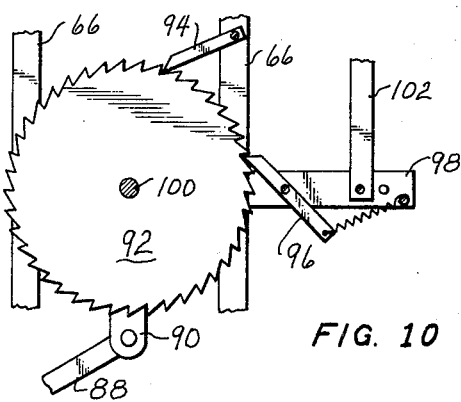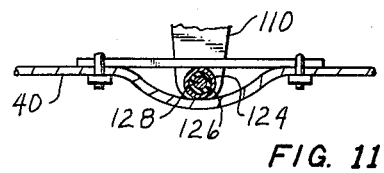

IRRIGATION SYSTEM WITH DRIVING CHALK LINE

Filed Aug. 23, 1967     3 Sheets-Sheet 1

INVENTORS: RALPH D. BOONE &
RUFUS J. PURTELL

March 17, 1970 R. D. BOONE ET AL 3,500,856
IRRIGATION SYSTEM WITH DRIVING CHALK LINE
Filed Aug. 23, 1967 3 Sheets-Sheet 3

INVENTORS: RALPH D. BOONE &
RUFUS J. PURTELL
BY:

United States Patent Office

3,500,856
Patented Mar. 17, 1970

3,500,856
IRRIGATION SYSTEM WITH DRIVING CHALK LINE
Ralph D. Boone, Clovis, N. Mex., and Rufus J. Purtell, Brownfield, Tex., assignors to The J. B. Knight Co. Inc., Brownfield, Tex., a corporation of Texas
Filed Aug. 23, 1967, Ser. No. 662,802
Int. Cl. A01g 25/02
U.S. Cl. 137—344                    16 Claims

ABSTRACT OF THE DISCLOSURE

An irrigation system is driven by reciprocating a cable which extends the length of the irrigating pipe. The cable oscillates a lever on each vehicle which operates mechanism to move the vehicle forward. Depending upon the condition of alignment of the vehicle, the swinging of the lever will engage or disengage a dog to bring the vehicle into alignment with the remaining vehicles if misaligned.

CROSS-REFERENCE TO RELATED APPLICATIONS

The disclosures in Purtell patent application No. 617,610, filed Feb. 21, 1967, is of interest to the disclosure and claims of this application. However, no claim of priority dates is made at this time.

BACKGROUND OF THE INVENTION

Field of the invention

This invention relates to agricultural irrigation by sprinkling water on the land and more particularly to a system which maintains its alignment as the irrigation pipe transverses the field.

Description of the prior art

Much of the agricultural land in the United States today is irrigated by sprinkling water upon the field from a pipe, the pipe being mounted upon a plurality of vehicles which move the pipe as the field is watered. Examples of such system are shown in Zybach U.S. Patents #2,604,359 and #3,001,721. One of the problems encountered is the maintaining of the various vehicles in alignment. Misalignment may be caused by the slippage of the wheels of the various vehicles. It will be understood that the vehicles operate where the land has been irrigated and, therefore, in a muddy field. Zybach basically solves the problem by providing a water motor upon each vehicle and throttling the supply of water to the water motor by a valve which is controlled by a cable which is attached to either side of the vehicle. If the vehicle is out of line, the bending of the pipe will cause the cable to tighten or slacken, controlling the valve and permitting more or less water to flow to the water motor.

Also, Zybach Patent #3,001,721 discloses a safety cable as one or two separate cables extending the length of the irrigation system. Therefore, if gross misalignment occurs, the stretching or loosening of the control cable operates to either shut down the entire system or to cause the system to stop moving while still irrigating.

Hogg U.S. Patent #3,334,815 discloses a system for maintaining the alignment of the vehicles. In it the misalignment is detected much the same as in the Zybach disclosures, however, the information is used to either completely engage or disengage a clutch so that the vehicle is either driven or not driven.

Boone U.S. Patent #3,302,656 discloses an alignment system whereby a chalk line or a taut line is stretched from one end of the system to the other and then levers on each vehicle are attached to this taut line. If the vehicle is out of line the movement of the levers relative to the vehicle will operate mechanism to speed up or slow down that particular vehicle.

Sauer U.S. Patent #466,187 discloses an irrigation system having a wheeled vehicle which is propelled by pushing poles. The pushing poles are activated by reciprocating cables.

Boone U.S. Patents #3,268,174 and #3,302,656 disclose skid-type vehicles, each of which is propelled forward by push-leg mechanism which is reciprocated. The latter Boone patent discloses an operating mechanism for the propelling leg which is readily reversible, the leg being from a parallelogram machine element. These two Boone patents also are propelled forward by a reciprocating cable arrangement.

Zander, a German patent, #414,551 discloses a reciprocating cable arrangement for driving an irrigation system forward wherein the reciprocation of the cable acts through a bell-crank arrangement to operate a ratchet which rotates a wheel which moves the system forward.

Purtell U.S. Patent #3,220,654 disclosed in FIG. 8 a chain drive mechanism for reciprocating a cable for driving vehicles of an irrigation pipe-moving system.

SUMMARY OF THE INVENTION

The invention presented here uses a single reciprocating cable for the combined functions of providing driving power to move the vehicles forward, to provide a chalk line for aligning each of the vehicles, and to provide a gross misalignment indicator to shut down the system in the event of serious misalignment which might damage the system.

The single cable is stretched with considerable tension because the tension is used to drive the vehicles. Therefore, it has enough strain so that it is straight. Being stretched straight (much as a chalk line used by brick layers and other construction workers), it provides a convenient reference which is straight from one end of the system to the other by which all of the vehicles may be aligned. Thus the application derives the title of a driving chalk line for an irrigation system.

The invention is conceived to be broadly the use of the single cable to perform the three functions or any two of them. Although the preferred embodiment described hereinafter shows the use of a lever to both transmit the driving power and the alignment information, different mechanisms could be used. For example a "painter," as used in Purtell Patent #3,220,654 or Boone Patent #3,268,174 or the Zander German patent could be used, while still leaving the main power cable to move toward and away from the pipe for alignment purposes. The alignment could be achieved by various means, for example, by blanking off teeth of the ratchet, as shown in Purtell Patent #3,200,654, or by changing the diameter of variable diameter sheaves, such as shown in Purtell Patent #3,245,595, or the disengagement of a clutch as shown in Hogg Patent #3,334,815.

The reciprocating driving cable which extends the length of the system is insulated at each end and at each vehicle where it is connected thereto. An electrical charge is placed upon the cable. If gross misalignment occurs and the cable touches the irrigation pipe which is adjacent thereto, the contact with the irrigation pipe will ground the cable which is electrically connected to the controls of the motor driving the system and this will result in the shutting down of the motor so that gross misailgnment will not bend the pipe and cause serious damage to the system. Also, this system operates as an emergency cut-off switch. A person working anywhere along the system may cut off the motor by grounding the cable by either moving the cable against the pipe or placing a conductor between the pipe and the cable.

An object of this invention is to move an agricultural irrigation pipe system across a field.

Another object is to move an agricultural irrigation pipe system across the field while maintaining it in alignment as it moves.

Another object is to achieve the above with safeguards which will cut off the motor in case the system gets grossly out of line.

Further objects are to achieve the above with a device that is sturdy, compact, durable, simple, safe, versatile, and reliable, yet inexpensive and easy to manufacture, erect, operate, and maintain.

Still further objects are to achieve the above with a method that is safe, rapid, and inexpensive and does not require skilled people to erect, adjust, operate, and maintain.

The specific nature of the invention, as well as other objects, uses, and advantages thereof, will clearly appear from the following description and from the accompanying drawings, the different views of which are not necessarily to the same scale.

DESCRIPTION OF THE DRAWINGS

FIG. 3 is a partial rear sectional view thereof taken substantially on line 3—3 of FIG. 2.

FIG. 4 is a sectional view looking down upon certain mechanism thereof taken substantially on line 4—4 of FIG. 2.

FIG. 10 is a detailed sectional view showing a portion of the driving mechanism taken substantially on line 10—10 of FIG. 3.

FIG. 11 is a detailed description of the cable to the driving mechanism taken substantially on line 11—11 of FIG. 2.

DESCRIPTION OF THE PREFERRED EMBODIMENT

Figure 1:
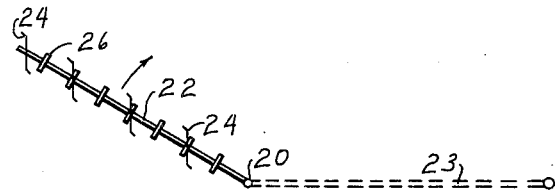
FIG. 1 is a plan schematic representation of a system according to this invention.

The illustrated agricultural irrigation system is designed to move in a circle about pivot pipe 20 (FIG. 1).

Elongated pipe 22 has a plurality of sprinklers 24 mounted upon it. The pipe 22 is pivotally connected to the pivot pipe 20. Therefore, the pivot pipe 20 is a source of water under pressure to the moving pipe 22, also underground pipe 23 is a source of water under pressure to the pivot pipe 20.

Plurality of vehicles 26 movingly support the pipe 22.

Figure 5:
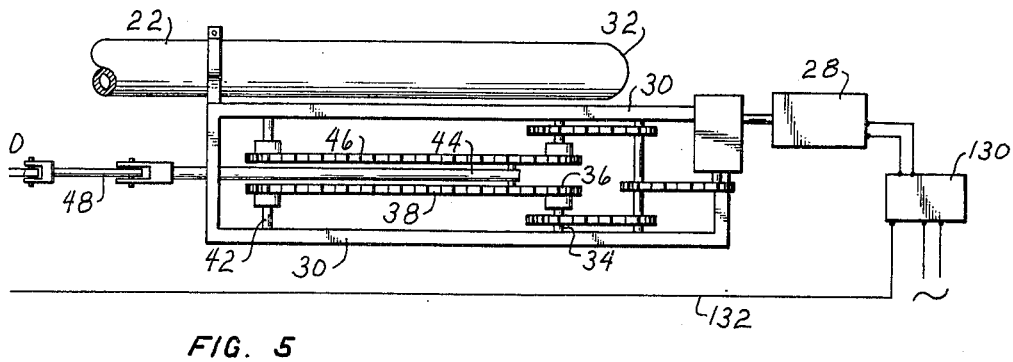
FIG. 5 is a plan view of a portion of the system showing chain-drive mechanism for reciprocating the driving cable.

Motor 28 is mounted upon frame 30 attached to elbow 32 which is at the connection of pipe 22 and the pivot pipe 20 (FIG. 5). It will be understood that the motor 28 could be a power means of any conventional type, e.g., an electric motor (as schematically illustrated) or a hydraulic motor power from the water flowing through pipe 22. However, it is preferred to use an internal combustion engine. The motor 28 is connected by suitable gearing to the shaft 34. The shaft 34 carries sprocket 36 upon which is trained chain 38. The chain 38 is used to reciprocate driving cable 40.

The chain 38 extends between sprocket 36 on shaft 34 and a like sprocket on shaft 42. The shafts 34 and 42 are journaled to the frame 30. Pitman 44 is connected to the chain 38. Rotation of the shaft 34 by the motor 28 will cause the pitman to reciprocate. For design reasons, a duplicate chain 46 is run over sprockets on shafts which are coaxial with shafts 34 and 42.

Insulator 48 in the form of elongated bar is attached to the end of the pitman 44 and the cable 40 is attached to the end of the insulator, thus electrically insulating driving cable 40 from the pipe 22.

Figure 7:
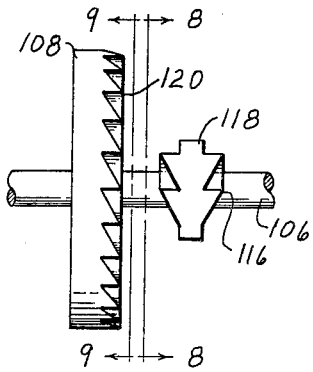
FIG. 7 is an enlarged partial detail view of a portion of the driving mechanism of a vehicle taken substantially on line 7—7 of FIG. 3.
Figure 8:
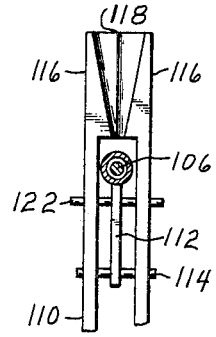
FIG. 8 is a sectional view showing an enlarged view of a portion of the driving mechanism taken substantially on line 8—8 of FIG. 7.
Figure 9:
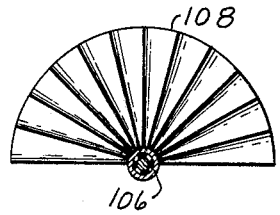
FIG. 9 is a detailed sectional view of a portion of driving mechanism taken substantially on line 9—9 of FIG. 7.

The means for reciprocating the cable 40 from the power means or motor 28 described above in detail is substantially similar to mechanism illustrated in FIGS. 7 and 8 of Purtell U.S. Patent #3,220,654. Other mechanisms are suitable for reciprocating the cable from the motor 28, and gear boxes and other conventional mechanical transmission devices are shown but not described.

The cable 40 is used as an elongated tension element. Although a cable of wire rope is preferred, any elongated element such as a rod or a tube is suitable provided that it has suitable electrical conducting characteristics, as will be described hereinafter, and sufficient tensile strength to power the unit. Therefore, when the term "cable" is used in this specification or claims, it will be understood it is meant to be the equivalent of any rod or tube having the above described properties.

Figure 6:
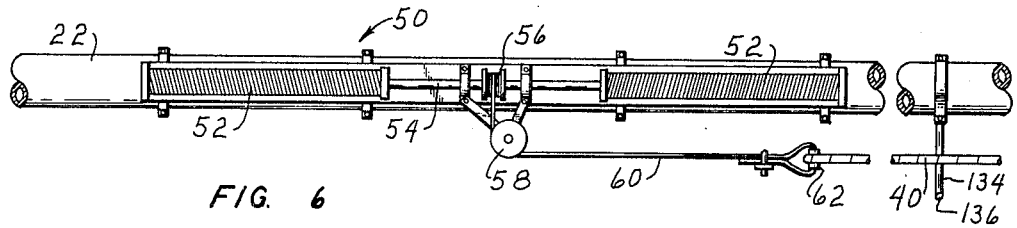
FIG. 6 is a plan view of a portion of the system showing spring mechanism for maintaining the driving cable taut.

At the end of the pipe 22, remote from the pivot pipe 20 and beyond the last vehicle 26, spring 50 is attached to the pipe 22 (FIG. 6). The spring 50 is means for keeping the slack from the cable 40 or keeping it taut. The specific embodiment illustrated includes a pair of torsion springs 52 which are mounted on a central axle 54 which is journaled to the pipe 22 parallel to the pipe. Sheave 56 is attached on the axle 54 at the center between the two springs 52. Block 58 is attached to the pipe 22 to guide leader 60 upon the sheave 56. Insulator 62 connects the leader 60 to the driving cable 40.

The springs 52, as described above, are commercially available on the market for use on overhead doors. They have a simple adjustment so that the tension in the cable 40 is readily adjustable.

Figure 2:
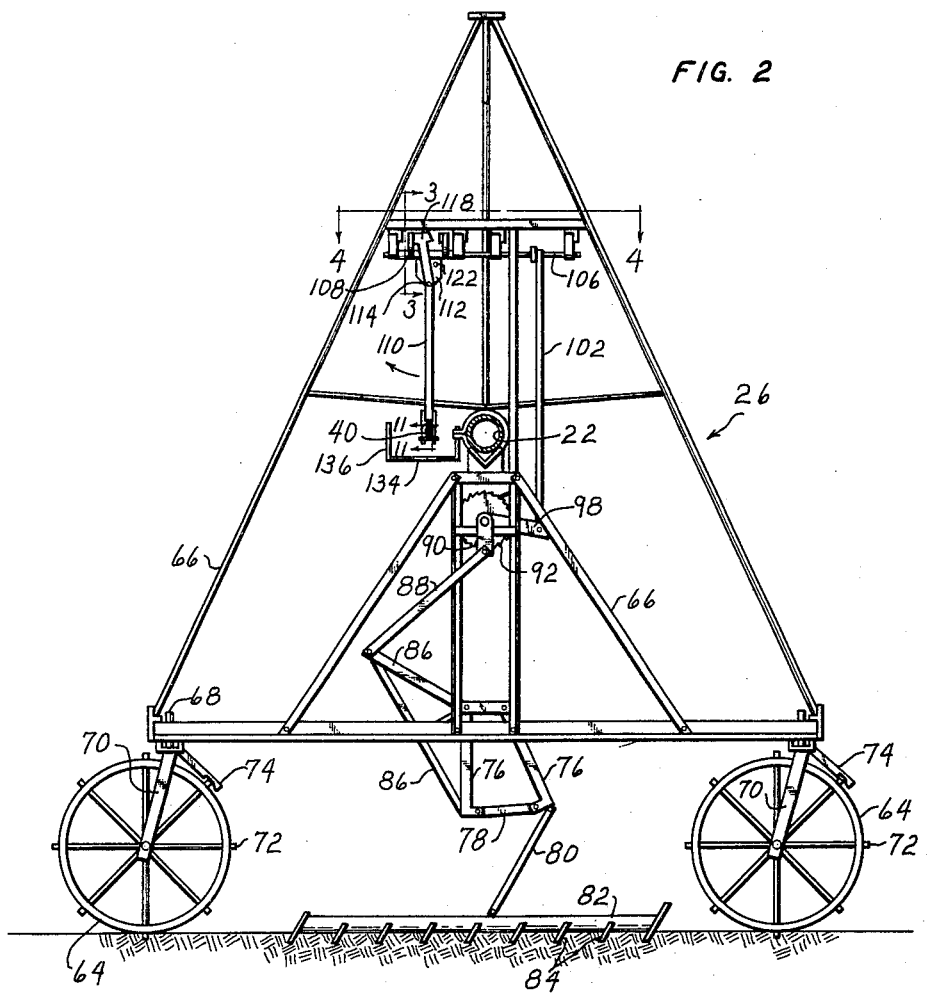
FIG. 2 is a side elevational view of one vehicle of that system.

Each vehicle 26 has a pair of wheels 64 which are castered to frame 66 of the vehicle 26 by vertical shaft 68 (FIG. 2). The wheel is supported in bracket 70 which is attached to the verticle shaft 68. The wheels each have a plurality of lugs 72 on them. Notched bar 74 is pivoted on the bracket 70 so as to form a ratchet in cooperation with the lugs 72. Thus ratchet means are provided for each wheel so that the wheel may rotate in a forward direction only. The purpose of this ratchet is because the vehicles are propelled by the pushing mechanism described later. Therefore, if the ratchets were not provided it would be possible for the leg to push the vehicle forward up an incline and then when leg was being retracted for another forward push for the vehicle to coast backwards. However, with the ratchet arrangement the vehicle will not roll backwards.

Legs 76 are pivoted to the frame 66 to depend therefrom (FIG. 2). Hobble 78 pivotally connects the legs together. Shank 80 is pivoted to one of the pins pivoting hobble 78 to one of the legs 76. Foot 82 is pivoted to the bottom of the shank 80. The foot has a plurality of cleats 84 so that as it is reciprocated along the ground it propels the vehicle 26 forward. The legs 76 are oscillated by stiff leg 86 which is connected to one of the pivot pins connecting leg 76 to hobble 78. If it is desired to reverse the motion of the vehicle, such may readily be done by disconnecting the shank 80 from its pivot point and connecting it to the other leg 76 at its pivot. The mechanism and the reversing operation of the foot is the same as described in the Boone Patent #3,302,656.

The stiff leg 86 is pivoted through connecting rod 88 to crank arm 90 (FIGS. 2 and 10). The crank arm 90 is attached to ratchet wheel 92. Analysis readily shows that the rotation of ratchet wheel 92 will, through the action of crank arm 90 and connecting rod 88, oscillate the stiff leg 86 which will result in the forward driving action of the foot 82.

Ratchet wheel 92 has a dog 94 from the frame 66 to prevent it from rotating backwards. It is rotated forward by pawl 96 attached to levers 98. The levers 98 are pivoted to shaft 100 which carries ratchet wheel 92. Drop arm 102 is pivoted between lever 98 and crank arm 104. The crank arm 104 is rigidly attached to oscillating shaft 106 which is journaled to the upper part of frame 66 (FIGS. 3 and 4). Oscillating shaft 106 is oscillated by action of power lever 108 and drive arm 110 which is connected to driving cable 40, as will be more fully described hereinafter. The oscillation of the oscillating shaft 106 will rise and lower the drop arm 102 which will move the levers 98 up and down which will rotate the ratchet wheel 92 through the action of the pawl 96. As previously described, the rotation of the ratchet wheel 92 will drive the vehicle forward. Thus there is provided on each vehicle 26 a drive means interconnecting the vehicle and the cable 40 for driving vehicle responsive to reciprocation of the cable.

The axis of ratchet wheel shaft 100 is parallel to the axis of the elongated pipe 22 and as a matter of design is located directly below the pipe 22. As a matter of design the axis of the oscillating shaft is horizontal and transverse the pipe 22. The axis of the oscillating shaft 106 would be aligned with the direction of movement of the vehicle.

Power lever 108 is rigidly connected to the oscillating shaft 106 (FIGS. 3, 4, 7, 8, and 9). Ear 112 is journaled about oscillating shaft 106. Pin 114 extends through the ear 112 and the drive arm 110. The pin 114 is generally parallel to the shaft 100 and, therefore, also is generally parallel to the drive cable 40. Teeth 116 in driving head 118, which is the upper portion of drive arm 110, engage with teeth 120 in the power lever 108. Therefore, when the teeth 116 are engaged with the teeth 120, reciprocation of the cable 40 will oscillate the drive arm 110, which will oscillate the power lever 108. Inasmuch as the power lever is rigidly attached to the oscillating shaft 106, it will be oscillated thus driving the vehicle as hereinbefore described. However, inasmuch as drive arm 110 is pivoted to ear 112, if the cable 40 moves away from the pipe 22, as seen in FIG. 2, it will cause the teeth 118 on head 116 to disengage from teeth 120 on power lever 108. When this happens the reciprocation of the cable 40 will no longer oscillate the shaft 106 in that there will be a disconnection of the driving mechanism from that vehicle. Analysis will show that if the vehicle is moving from left to right as seen in FIG. 2; that if this vehicle moves forward of the other vehicles, it will move forward of cable 40 or increase the distance from the pipe 22 to the cable 40 inasmuch as cable 40 extends as a chalk line from one end of the system to the other. Also if the vehicle 26 is lagging behind the other vehicles, the distance between the pipe 22 at the vehicle and the cable 40 will decrease. This decrease will cause the drive arm 110 to pivot about the pin 114 to engage the teeth 116 with the teeth 120 thereby driving the vehicle forward.

The action described above could be described in different terms. Specifically, it could be said that means are provided to measure the distance between the cable 40 and the pipe 22 at each vehicle. Then the drive means is altered responsive to this measurement to maintain the vehicles in alignment. Specifically, this alteration has been described in this embodiment as a disengagment which disconnects the drive means responsive to the measurement of the distance.

As a matter of design, the pawl 96 upon the levers 98 are set to rotate and drive the ratchet wheel 92 when the drop arm 102 is moving upward (FIG. 10). This upward movement will occur when the cable 40 is being pulled toward the pivot pipe 20 by the drive chain 38. Therefore, when the cable 40 makes the driving stroke, the tension in the cable 40 will be greater and, therefore, it has sufficient tension so as to swing the levers about pivot pin 114.

If it is desired to drive the vehicles in the opposite direction, stop 122 in ear 112 is removed and placed on the other side of the arm 110. Also, the shank 80 is reversed as described above. Then the motion is in the opposite direction, i.e., from right to left. The teeth of head 118 will engage the teeth of power lever 109 (FIG. 4) in the event there is a larger distance between the driving cable 40 and the pipe 22. However, in that event the cable 40 will be ahead of the pipe 22 and a large distance will indicate that the pipe 22 is further behind in the line of movement. The stop 122 prevents the driving head 116 from driving the power lever 108 or 109 in the event a gross misalignment does occur.

The cable 40 is connected to the drive arm 110 by clamping it to a thimble 124 (FIG. 11). The thimble is insulated by nylon bushing 126 from the bolt 128 with which it is held to the drive arm 110. Therefore, it may be seen that in normal operating conditions the cable 40 is insulated from the pipe 22 at each place the cable is connected to the pipe. These connections include the driving mechanism which includes the chain 38 and the slack regulator which includes the springs 50. Also the cable 40 is indirectly connected to the pipe 22 at each of the vehicles 26.

Should gross misalignment occur with the vehicles moving closer to the cable, the cable will swing over and contact the pipe approximately midway between vehicles. When this occurs, the electrical resistance between the pipe 22 and the cable 40 will be reduced drastically, commonly called a short circuit. This difference in electrical resistance between the cable and the pipe is measured by conventional electrical circuits within control box 130 (FIG. 5). The control box controls the power means or motor 28. Electrical wire 132 connects the cable 40 to the control box 130. The cable 40 carries a positive charge, or stated otherwise, cable 40 is above ground electrically. Controls to shut down motors as the result of a short circuit between different points are well known and commercially available upon the market. They are commonly used on stationary internal combustion engines to shut down the engine because of low oil pressure or excessive cooling jacket temperature.

U-shaped metal brackets 134 are attached to the pipe 22 midway between vehicles 26 (FIGS. 2 and 6). The bracket has leg 136 which extends on the other side of cable 40 from the pipe 22 approximately an equal distance. Therefore, should gross misalignment in the opposite direction occur, the cable 40 will contact the leg 136, which is electrically connected to the pipe 22 which will result in shutting down the system in the same manner as if the cable had been touched by the pipe. Furthermore, should the cable become slack, it will touch the bottom of the bracket 134 to cut off the motor 28. Furthermore, should any workmen around the system desire to shut down the system, all that is necessary is for him to move the cable 40 against the bracket 134 or the pipe 22 or to throw an electrical conductor such as a wrench between cable 40 and the pipe 22. Thus it may be seen kill means have been provided for shutting down the system in the event of gross misalignment or emergency.

Those skilled in the art will know that customarily the pipe 22 is constructed of aluminum and the cable 40 from steel. Inasmuch as these have different coefficient of thermal expansion, one will expand more than the other at different temperatures. Normally, the drop arm 102 will fall by gravity when the teeth 116 are not engaged with teeth 120. Therefore, when the relation of the vehicles with respect to the drive cable 40 occurs such as that the teeth first become engaged that a regular oscillating stroke of regular oscillating shaft 106 will occur. Furthermore, if only a partial stroke is made at one time, the teeth 118 and 120 are beveled so that they can slip one upon the other. Therefore, regardless of the longitudinal orientation between the cable 40 and the pipe 22, each oscillation of the cable 40 will result in a full power stroke of levers 98, if the distance between pipe 22 and cable 40 is such that the drive means is in the connected, driving position. This is so because several positions of engagement (teeth 120 and teeth 116) are provided in the drive means to compensate for changes in longitudinal position of the cable and the pipe.

The drawings illustrate the frame 66 of each vehicle 26 as including a tower-like structure. Inasmuch as the invention in this application does not include this, it will not be further described here; nor will the details of the bracing of the frames, guy wires or other elements well known to the art.

We claim as our invention:

1. In an agricultural irrigation system having
   (a) an elongated pipe adapted to carry sprinklers mounted thereon,
   (b) means for supplying water under pressure to said pipe,
   (c) a plurality of vehicles movingly supporting said pipe,
   (d) power means operatively associated with the system for moving the system,
   (e) a cable extending along the pipe the length of the pipe,
   (f) said cable mounted to the two ends of the pipe for reciprocating movement,
   (g) means interconnecting the power means and cable for reciprocating the cable, and
   (h) drive means on each vehicle interconnecting the vehicle and cable for driving the vehicle responsive to reciprocation of the cable;
   (j) the improvement in combination with the above comprising:
   (k) alignment means including said cable on each vehicle for maintaining the vehicle in alignment with said cable.

2. The invention as defined in claim 1 with the additional limitation of
   (m) said cable electrically insulated from the pipe in ordinary operation, and
   (n) kill means interconnecting the power means and the cable for cutting off the power means responsive to a change in the electrical resistance between the cable and the pipe.

3. The invention as defined in claim 1 with the additional limitation of
   (m) each vehicle having
      (i) at least one wheel and
      (ii) a push leg for pushing the vehicle forward, and
   (n) ratchet means operatively associated with each wheel for permitting said wheel to rotate forward only.

4. The invention as defined in claim 1 with the additional limitation of said drive means and said alignment means, including:
   (m) said cable mounted for movement to and away from the pipe at each vehicle,
   (n) disengagement means on each vehicle for disconnecting the drive means on that vehicle responsive to the distance of the cable to the pipe at the vehicle.

5. The invention as defined in claim 4 with the additional limitation of
   (o) said disengagement means having several engagement positions to compensate for changes in longitudinal position between the cable and the pipe.

6. The invention as defined in claim 1 with the additional limitation of said drive means and said alignment means including:
   (m) a power lever pivoted to the vehicle,
   (n) mechanical transmission means connected to the power lever for driving the vehicle,
   (o) a drive arm pivoted to the power lever,
   (p) the drive arm connected to the cable, and
   (q) means for inactivating the mechanical transmission interconnecting the drive arm and the mechanical transmission means.

7. The invention as defined in claim 6 with the additional limitation of
   (r) said means for inactivating having several activating positions to compensate for changes in longitudinal position between the cable and the pipe.

8. The invention as defined in claim 6 with the additional limitation of
   (r) said cable electrically insulated from the pipe in ordinary operation, and
   (s) kill means connecting the power means and the cable for cutting off the power means responsive to a change in the electrical resistance between the cable and the pipe.

9. In an agricultural irrigation system having
   (a) an elongated pipe adapted to carry sprinklers mounted thereon,
   (b) means for supplying water under pressure to said pipe,
   (c) a plurality of vehicles movingly supporting said pipe, and
   (d) power means operatively associated with the system for moving the system;
   (e) the improvement in combination with the above comprising:
   (f) a cable extending along the pipe the length of the pipe;
   (g) said cable electrically insulated from the pipe, and
   (h) kill means for cutting off the power means responsive to a low electrical resistance between the cable and the pipe, said kill means interconnecting the cable and the power means.

10. The invention as defined in claim 9 with the additional limitation of
    (j) said cable mounted to the two ends of the pipe for reciprocating movement,
    (k) means interconnecting the motor and cable for reciprocating the cable,
    (m) drive means on each vehicle interconnecting the vehicle and cable for driving the vehicle responsive to reciprocation of the cable.

11. The invention as defined in claim 9 with the additional limitation of
    (j) alignment means on each vehicle interconnecting said vehicle and cable for maintaining the vehicles in alignment with said cable.

12. The invention as defined in claim 11 with the additional limitation of
    (k) said cable mounted for reciprocal movement,
    (m) means interconnecting the power means and cable for reciproctaing the cable, and
    (n) drive means on each vehicle interconnecting the vehicle and cable for driving the vehicle responsive to reciprocation of the cable.

13. In an agricultural irrigation system having
    (a) an elongated pipe adapted to carry sprinklers mounted thereon,
    (b) means for supplying water under pressure to said pipe,
    (c) a plurality of vehicles movingly supporting said pipe,
    (d) power means operatively associated with the system for moving the system,
    (e) a cable extending along the pipe the length of the pipe, (f) said cable mounted to the two ends of the pipe for reciprocating movement,
(g) means interconnecting the power means and cable for reciprocating the cable, and
(h) drive means on each vehicle interconnecting the vehicle and cable for driving the vehicle responsive to reciprocation of the cable;
(j) the improvement in combination with the above comprising:
(k) said drive means having several positions of engagement to compensate for changes in longitudinal position between the cable and the pipe.

14. In an agricultural irrigation system having
(a) an elongated pipe adapted to carry sprinklers mounted thereon,
(b) means for supplying water under pressure to said pipe,
(c) a plurality of vehicles movingly supporting said pipe,
(d) power means operatively associated with the system for moving the system,
(e) each vehicle having:
    (i) at least one wheel and
    (ii) a push leg for pushing the vehicle forward, and
(f) means interconnecting the power means and the push leg on each vehicle for driving each vehicle;
(g) the improvement in combination with the above comprising:
(h) ratchet means operatively associated with each wheel for permitting said wheel to rotate forward only.

15. In an agricultural irrigation system having
(a) an elongated pipe adapted to carry sprinklers mounted thereon,
(b) means for supplying water under pressure to said pipe,
(c) a plurality of vehicles movingly supporting said pipe,
(d) power means operatively associated with the system for moving the system,
(e) a cable extending along the pipe the length of the pipe,
(f) said cable mounted to the two ends of the pipe for reciprocating movement,
(g) means interconnecting the motor and cable for reciprocating the cable, and
(h) drive means on each vehicle interconnecting the vehicle and cable for driving the vehicle responsive to reciprocation of the cable;
(j) the method of maintaining the vehicles in alignment comprising the step of:
(m) altering said drive means on each vehicle responsive to the distance from the pipe to the cable at each vehicle.

16. In an agricultural irrigation system having
(a) an elongated pipe adapted to carry sprinklers mounted thereon,
(b) means for supplying water under pressure to said pipe,
(c) a plurality of vehicles movingly supporting said pipe, and
(d) power means operatively associated with the system for moving the system;
(e) the method of preventing damage to system from gross misalignment comprising:
(f) extending a cable along the pipe the length of the pipe,
(g) insulating electrically the cable from the pipe where the cable is connected to the pipe,
(h) detecting changes in the electrical resistance from the cable to the pipe, and
(j) protecting the system responsive to a change in electrical resistance.

References Cited

UNITED STATES PATENTS

| | | | |
|---|---|---|---|
| 2,604,359 | 7/1952 | Zybach | 239—177 |
| 3,001,721 | 9/1961 | Zybach | 239—177 |
| 3,268,174 | 8/1966 | Boone | 239—177 XR |
| 3,281,080 | 10/1966 | Hogg | 137—344 XR |
| 3,302,656 | 2/1967 | Boone | 239—177 XR |
| 3,334,815 | 8/1967 | Hogg | 239—177 XR |
| 3,353,750 | 11/1967 | Dowd | 239—177 |
| 3,386,661 | 6/1968 | Olson et al. | 239—177 |
| 3,406,907 | 10/1968 | Wallace | 239—177 |

SAMUEL SCOTT, Primary Examiner

U.S. Cl. X.R.

239—177